June 7, 1938.  K. IIDA  2,119,816
BUTTERFLY VALVE
Filed April 16, 1936　　2 Sheets-Sheet 1
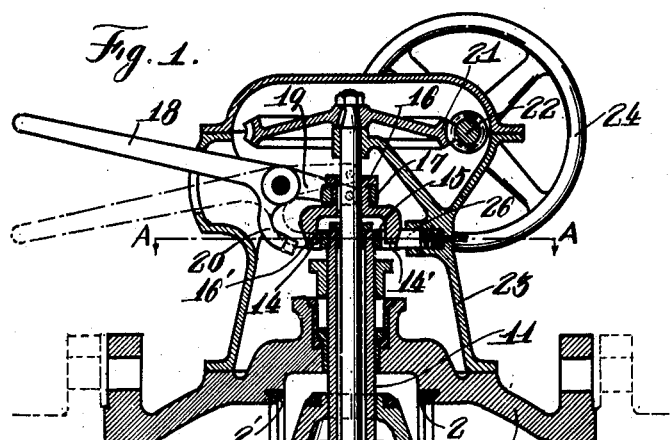
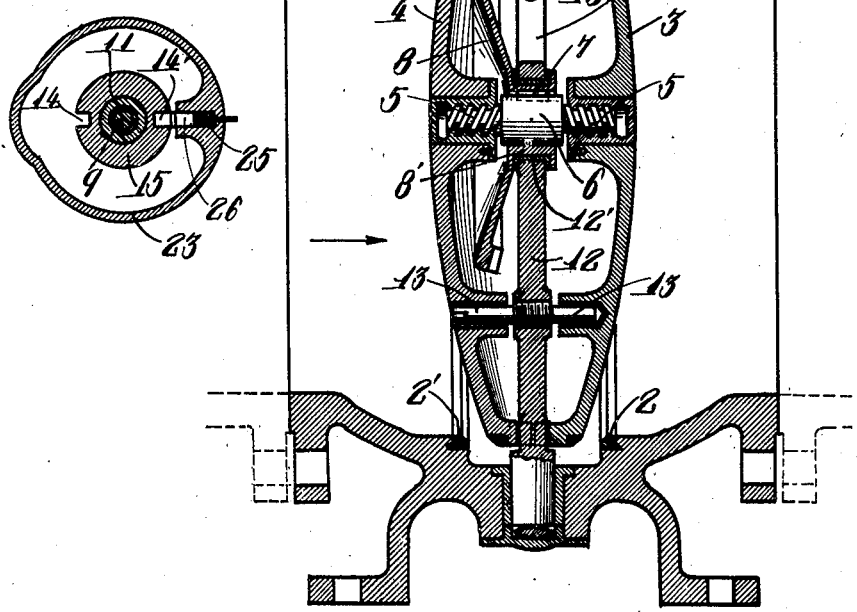
Inventor
Koji Iida
By E. F. Wenderoth
Attorney

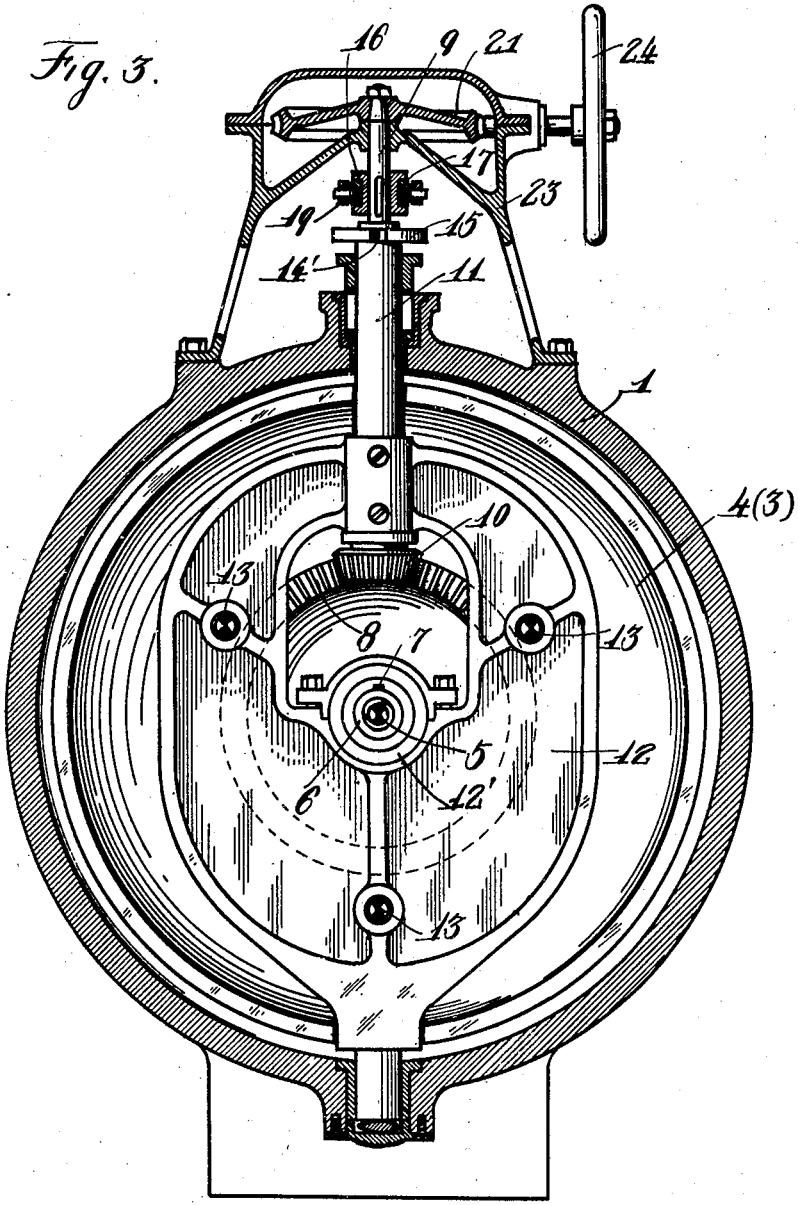

Patented June 7, 1938

2,119,816

UNITED STATES PATENT OFFICE 2,119,816

BUTTERFLY VALVE

Koji Iida, Itabashi-ku, Tokyo, Japan

Application April 16, 1936, Serial No. 74,758
In Japan May 9, 1935

6 Claims. (Cl. 251—11)

This invention relates to a new and improved valve designed to act smoothly and check the liquid flow completely regardless of the direction in which the flow may pass through the valve.

An object of the invention is to construct a valve in which a pair of closure discs are used moving relatively to one another and in which one of said discs will seat slightly in advance of the other so that pressure may be equalized upon both sides of the other closure disc prior to the complete closing of the same.

Heretofore when both closure discs were seated at the same time a smooth and accurate closing of the closure discs upon their seats has been lacking.

A further object of the invention is to provide means whereby the movement of the closure discs to completely open position is only possible when the closure discs have been moved inwardly furthest from their cooperating seats.

A further object of the invention is to provide means whereby the closure discs are urged against their respective seats by equal pressures.

With the above and other objects in view which will become apparent as the description proceeds the invention is described in detail below, claimed in the claims and illustrated in the drawings, in which Figure 1 is a vertical section of the valve according to this invention, Figure 2 is a cross section taken on the section line A—A in Figure 1, Figure 3 is a cross sectional view taken at right angles to the view in Figure 1.

Referring to the drawings in which like reference characters indicate like elements 3 and 4 are the closure discs mounted oppositely on the shaft 5 which is provided with a right hand thread at one end and a left hand thread at the other. The central part 6 of the shaft 5 has a key 7 which slides in a guideway provided in the hub portion 8' of the bevel gear 8. Instead of the key 7 and the cooperating groove the portion 6 of the shaft 5 may have a polygonal shape and in such case the hub portion of the bevel gear 8 will have a corresponding shape.

The bevel gear 8 is held in position by the bushing 12' which in turn is fixed on the pivotally mounted frame 12 preferably positioned vertically in the valve casing 1. Bevel gear 10 fixed on the driving shaft 9 meshes with bevel gear 8.

The driving shaft 9 extends through a cylindrical tube 11 which in turn is connected with the frame 12.

The closure discs 3 and 4 are prevented from rotative movement with relation to the frame 12 by means of the pin 13 which is screwed into the frame 12 as shown particularly in Figure 1 and cooperates with recessed bosses as shown.

At the upper end of the cylindrical tube 11 there is provided a clutch member 15 which is provided with two diametrically opposed recesses 14 and 14'. The cooperating clutch member 16 slides on the shaft 9 and is provided with two claw members 16' designed to cooperate with the recesses 14 and 14'. The sliding clutch member 16 is connected to the end 19 of the operating clutch lever 18 by means of the ring 17. On the lever 18 there is also provided a branch arm 20. When the lever 18 is operated so as to unclutch the clutch members and moved into the dotted line position shown in Figure 1 then the branch arm 20 will enter the recess 14 in order to lock the tubular member 11 and the frame 12 from rotative movement. The locking of the tube 11 is only possible when the closure discs 3 and 4 are brought closest together and furthest from their cooperating seats 2 provided in the casing 1.

At the upper end of the driving shaft 9 there is fixed a worm gear 21 engaged by the worm 22 which in turn is fixed to the shaft operated by the hand wheel 24. The clutching elements and worm wheel are enclosed within the casing 23 mounted on the valve casing 1.

In addition to the locking branch 20 provided on the clutch operating lever 18 there is also provided a locking pin 26 which is urged towards the clutch member 15 by the spring 25 seated in the casing 23 normally opposite the recess 14'. When the clutch member 16 is operated so as to remove the claws 16' from the recess 14' then the pin 26 will enter the recess 14' and cooperate with the branch arm 20 in locking the tubular member 11.

In operating the valve the clutch lever 18 is first lifted to the position shown in full lines in Figure 1 and in such position the claws 16' of the clutch member 16 enter the recesses 14 and 14' of the clutch member 15 when the closure discs 3 and 4 are closest together. In this movement of the claws 16' the pin 26 is urged out of the recess 14' against the action of the spring 25 by the claw member itself.

If the hand wheel 24 is now operated the driving shaft 9, the cylindrical tube 11 and the frame 12 will rotate as one body and the valve may be moved to fully open position and the valve may be moved from the fully open position to the intermediate closing position as shown in Figure 1. When the closure discs have reached the position shown in Figure 1 then the clutch operating lever is moved downwardly to the dotted line position shown in Figure 1 and the claws 16' are removed from the recesses 14 and 14'. At the same time by the movement of the lever 18 the arm 20 will fit into the recess 14 and the pin 26 will fit into the recess 14' thereby locking the cylindrical tube 11 from any further rotation.

Therefore the closure discs 3 and 4 are held firmly in the intermediate position exactly parallel to the valve seats 2. Now if the driving shaft 9 is further rotated by means of the hand wheel 24 the threaded rod 5 will be rotated by means of the bevel gears 10 and 8 and the closure discs are separated from one another gradually moving towards the valve seats 2. Assuming that the liquid flow is coming from the direction of the arrows in Figure 1 then the closure discs 3 and 4 due to the slidability of the shaft 5 in the hub 8' of the bevel gear 8 will be moved by the pressure of the liquid flow slightly in the direction of the liquid flow. Such being the case the closure disc 3 located furthest from the liquid pressure first comes into contact with its valve seat and is first moved into completely closed position. However with the closure disc 3 completely closed the closure disc 4 has not yet come in contact with its valve seat and therefore the pressure is equalized upon both sides of the closure disc 4. Due to this equalization of pressure the closure disc 4 may be easily brought against its valve seat and pressed firmly thereagainst.

From the construction described above it is apparent that the closure discs 3 and 4 are slidable with respect to the driving mechanism therefor and will operate in the reverse manner if the flow should be in the direction opposite to that of the arrows in Figure 1. In such case the closure disc 4 will first close and the pressure will be equalized upon both sides of closure disc 3 prior to the seating of closure disc 3 upon its seat.

Furthermore since in the closed position the pressure of the liquid flow does not act directly upon the operating mechanism of the valve there is no danger of bending or breaking the frame and the driving shaft even though there should be a sudden increase of pressure due to any cause. Also in case the closure discs should arrive in an improper position, that is, non-parallel to the valve seat there will nevertheless be no danger of the closure discs spreading apart from one another. Therefore there will be no danger of damaging the valve seats and the closure discs due to any rubbing action of the closure discs against the valve seat when the closure discs are turned.

It is understood that the above described embodiment is merely illustrative of what is now considered the preferred form.

Having described the details of my invention referring to the accompanying drawings, what I claim as new is:

1. A valve comprising a casing, spaced annular seats on said casing, a frame pivotally mounted in said casing, a shaft slidably and rotatively mounted in said frame having threads of opposite pitch on each end thereof, closure discs having threaded portions threaded on the threaded ends of said shaft, a rotatable tube secured to said frame, a second shaft operatively associated with said first mentioned shaft and means for operatively associating said tube with said second shaft to rotate said frame.

2. A valve comprising a casing, a frame pivotally mounted in said casing and having a tubular trunnion, a shaft slidably and rotatively mounted in said frame having oppositely threaded ends, closure discs threaded on said threaded ends, means preventing relative rotation between said frame and said discs, means extending through said tubular trunnion for rotating said shaft and thereby moving said discs relative to one another and seats on said casing with which said discs cooperate, and means for coupling said tubular trunnion with said shaft rotating means.

3. A valve comprising a casing, a frame pivotally mounted in said casing and having a tubular trunnion, a shaft slidably and rotatively mounted in said frame having oppositely threaded ends, closure discs threaded on said threaded ends, means preventing relative rotation between said frame and said discs, means extending through said tubular trunnion for rotating said shaft and thereby moving said discs relative to one another and seats on said casing with which said discs cooperate, a clutch member fixed to said tubular trunnion and a sliding cooperating clutch member on said shaft rotating means.

4. A valve comprising a casing, a frame pivotally mounted in said casing, seats on said casing, closure discs on said frame cooperating with said seats, means for moving said discs toward and away from said seats, means for rotating said frame together with said closure discs and means for operating said means for rotating said frame only when said closure discs are in completely open position, said last named means including a clutch.

5. A valve comprising a casing, a frame pivotally mounted in said casing, seats on said casing, closure discs on said frame cooperating with said seats, means for moving said discs toward and away from said seats, means for rotating said frame together with said closure discs and means for operating said means for rotating said frame only when said closure discs are in completely open position, said last named means including a clutch member having recesses and a sliding cooperating clutch member having claws cooperating with said recesses.

6. A valve comprising a casing, a frame pivotally mounted in said casing, seats on said casing, closure discs on said frame cooperating with said seats, means for moving said discs toward and away from said seats, means for rotating said frame together with said closure discs and means for operating said means for rotating said frame only when said closure discs are in completely open position, said last named means including a clutch, and means for locking said frame in non-rotative position.

KOJI IIDA.